United States Patent
Alasti et al.

(10) Patent No.: US 11,588,544 B2
(45) Date of Patent: *Feb. 21, 2023

(54) NON-TERRESTRIAL NETWORK SATELLITE BEAM SWITCHING

(71) Applicant: DISH Wireless L.L.C., Englewood, CO (US)

(72) Inventors: Mehdi Alasti, Reston, VA (US); Siddhartha Chenumolu, Broadlands, VA (US); Mariam Sorond, Reston, VA (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,059

(22) Filed: Feb. 3, 2022

(65) Prior Publication Data

US 2022/0158721 A1    May 19, 2022

Related U.S. Application Data

(63) Continuation of application No. 16/694,578, filed on Nov. 25, 2019, now Pat. No. 11,277,197.

(Continued)

(51) Int. Cl.
*H04B 7/185* (2006.01)
*H04B 7/08* (2006.01)
(Continued)

(52) U.S. Cl.
CPC ......... *H04B 7/18513* (2013.01); *H04B 7/088* (2013.01); *H04B 7/1855* (2013.01);
(Continued)

(58) Field of Classification Search
CPC ..... H04W 84/06; H04W 76/27; H04W 28/20; H04W 36/30; H04W 72/0453;
(Continued)

(56) References Cited

U.S. PATENT DOCUMENTS

2020/0052782 A1    2/2020    Wang et al.
2021/0058940 A1    2/2021    Choi et al.

FOREIGN PATENT DOCUMENTS

WO    2020/033675 A1    2/2020

OTHER PUBLICATIONS

Asia Pacific Telecom, "Discussion on physical layer control procedures for NTN", 3GPP TSG-RAN WG1 Meeting #98, R1-1908934, Aug. 26-30, 2019, 6 pages.

(Continued)

*Primary Examiner* — Ashley Shivers
(74) *Attorney, Agent, or Firm* — Seed IP Law Group LLP

(57) ABSTRACT

A method and apparatus for non-terrestrial network beam switching is provided. A non-terrestrial network base station includes a transmitter configured to transmit downlink data to user equipment and a receiver configured to receive uplink data from the user equipment. A channel bandwidth of the non-terrestrial network base station is divided into a plurality of bandwidth parts respectively corresponding to a plurality of geographic areas, and each bandwidth part is respectively associated with a satellite beam. When the user equipment is located in a first geographic area, the transmitter transmits the downlink data to the user equipment over a corresponding first bandwidth part. After the user equipment transitions from the first geographic area to a second geographic area, the transmitter transmits the downlink data to the user equipment over a corresponding second bandwidth part of the plurality of bandwidth parts.

20 Claims, 6 Drawing Sheets

Related U.S. Application Data

(60) Provisional application No. 62/889,889, filed on Aug. 21, 2019.

(51) Int. Cl.

| | | |
|---|---|---|
| *H04W 28/20* | (2009.01) | |
| *H04W 76/27* | (2018.01) | |
| *H04W 36/30* | (2009.01) | |
| *H04W 72/0453* | (2023.01) | |
| *H04W 72/044* | (2023.01) | |
| *H04W 84/06* | (2009.01) | |

(52) U.S. Cl.
CPC ..... *H04B 7/18508* (2013.01); *H04B 7/18521* (2013.01); *H04W 28/20* (2013.01); *H04W 36/30* (2013.01); *H04W 72/046* (2013.01); *H04W 72/0453* (2013.01); *H04W 76/27* (2018.02); *H04W 84/06* (2013.01)

(58) Field of Classification Search
CPC ... H04W 72/046; H04W 36/32; H04W 36/06; H04B 7/185; H04B 7/204; H04B 7/18513; H04B 7/088; H04B 7/18508; H04B 7/18521; H04B 7/1855; H04B 7/2041

See application file for complete search history.

(56) References Cited

OTHER PUBLICATIONS

Asia Pacific Telecom, MTI, "Physical layer control procedures", 3GPP TSG-RAN WG1 Meeting #97, R1-1907357, May 13-17, 2019, 4 pages.

CATT, CAICT, "Further discussion on physical layer control procedures", 3GPP TSG RAN WG1 Meeting #98, R1-1908590, Aug. 26-30, 2019, 4 pages.

CMCC, "Considerations on mobility for GEO", 3GPP TSG-RAN WG2 Meeting #107, R2-1909439, Aug. 26-30, 2019, 4 pages.

Evans et al., "5G Terrestrial and Satellite," Satellites for 5G Colloquium, University of Surrey, 2018 Ka band satellite conference, Niagara Falls, Oct. 2018, 24 pages.

Guidotti et al., "Architectures and Key Technical Challenges for 5G Systems Incorporating Satellites," arXiv:1806.02088v1 [cs.NI], Jun. 6, 2018, 18 pages.

International Search Report and Written Opinion for Application No. PCT/US2020/046980, dated Nov. 23, 2020, 17 pages.

Kuchi, "5G NTN," IIT Hyderabad, 6 pages.

Saamisaari, "Integration of 5G and Satcom," 6G Wireless Symposium, IEEE 5G Summit, Levi, FL, Mar. 24-26, 2019, 10 pages.

Watts et al., "Use cases to business modelling of satellite backhaul in 5G," 7 pages.

NON-TERRESTRIAL NETWORK SATELLITE BEAM SWITCHING

BACKGROUND

Technical Field

This application is directed to non-terrestrial network beam switching and, in particular, configuration of spatially-orthogonal satellite beams and bandwidth parts for different geographic areas, configuration and reconfiguration of user equipment bandwidth parts and switching an active bandwidth part for the user equipment.

Description of the Related Art

Non-terrestrial communication networks are characterized by using an Earth-orbiting satellite as a base station that communicates with an earthbound user equipment. In non-terrestrial communication networks, as well as other communication networks, time and frequency resources that are available for use in uplink and downlink channels are limited. Due to the need for ever-increasing communication data rates, it is particularly important to utilize the diversity gain to meet data rate demands.

BRIEF SUMMARY

In an embodiment, a non-terrestrial network base station is provided. The non-terrestrial network base includes a transmitter configured to transmit downlink data to user equipment and a receiver configured to receive uplink data from the user equipment. A channel bandwidth of the non-terrestrial network base station is divided into a plurality of bandwidth parts respectively corresponding to a plurality of geographic areas and each bandwidth part of the plurality of bandwidth parts is respectively associated with a satellite beam of a plurality of satellite beams. When the user equipment is located in a first geographic area of the plurality of geographic areas, the transmitter transmits the downlink data to the user equipment over a corresponding first bandwidth part of the plurality of bandwidth parts. After the user equipment transitions from the first geographic area of the plurality of geographic areas to a second geographic area of the plurality of geographic areas, the transmitter transmits the downlink data to the user equipment over a corresponding second bandwidth part of the plurality of bandwidth parts.

In an embodiment, the non-terrestrial network base station is configured to configure the user equipment with a bandwidth part configuration specifying a plurality of user equipment-configured bandwidth parts. When the user equipment is located in the first geographic area of the plurality of geographic areas, the plurality of user equipment-configured bandwidth parts include the first bandwidth part as an active bandwidth part and remaining bandwidth parts of the plurality of user equipment-configured bandwidth parts are inactive bandwidth parts. After the user equipment transitions from the first geographic area to the second geographic area, the plurality of user equipment-configured bandwidth parts include the second bandwidth part as the active bandwidth part and remaining bandwidth parts of the plurality of user equipment-configured bandwidth parts are inactive bandwidth parts.

In an embodiment, after the user equipment transitions from the first geographic area to the second geographic area, the non-terrestrial network base station reconfigures the active bandwidth part from the first bandwidth part to the second bandwidth part. In an embodiment, if prior to the user equipment transitioning from the first geographic area to the second geographic area, the plurality of user equipment-configured bandwidth parts do not include the second bandwidth part as the active bandwidth part or as an inactive bandwidth part, the non-terrestrial network base station reconfigures the bandwidth part configuration of the user equipment to include the second bandwidth part.

In an embodiment, the transmitter is configured to transmit, to the user equipment, the bandwidth part configuration by radio resource control (RRC) signaling or downlink control information (DCI). In an embodiment, the plurality of bandwidth parts are non-overlapping in a frequency domain.

DETAILED DESCRIPTION

Figure 1:
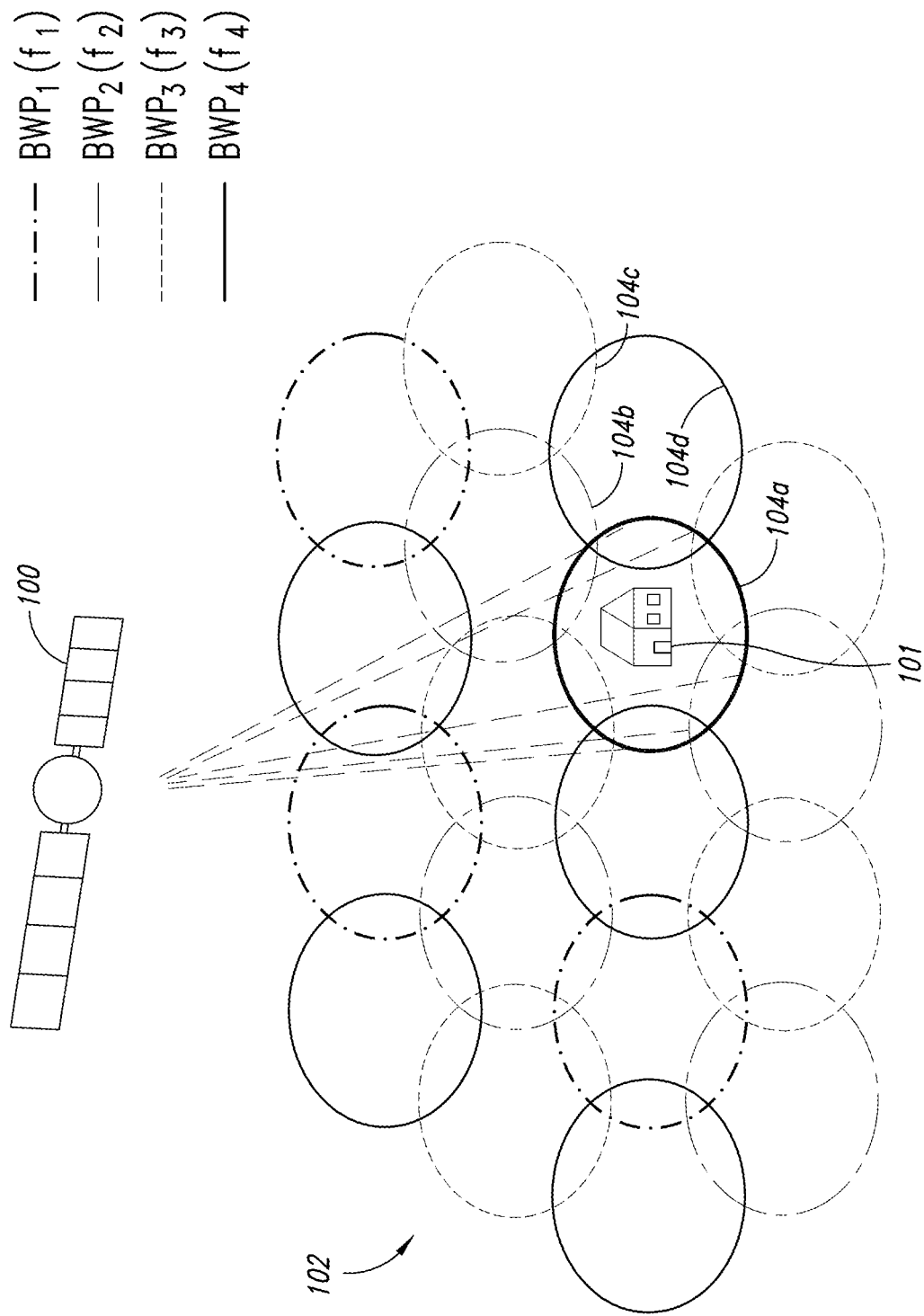
FIG. 1 shows an example of frequency reuse for a satellite in a non-terrestrial network.

FIG. 1 shows an example of frequency reuse for a satellite 100 in a non-terrestrial network. If the satellite 100 is a regenerative satellite, the satellite 100 may be a base station (denoted as 'NodeB' or in a 5G network as 'gNB') in a non-terrestrial network (NTN). If the satellite 100 is a bent-pipe satellite (also known as a transparent satellite), the base station may be located elsewhere in the non-terrestrial network and the satellite 100 may act as a relay for the base station. For example, the base station may be earthbound and on the ground.

The satellite has a coverage area 102 that is divided into a plurality of geographic areas, whereby each geographic area may be smaller than the coverage area 102. Spatial separation and frequency reuse are employed in the non-terrestrial network to reduce inter-beam interference and increase network capacity. Per the frequency reuse, a set of geographic areas 104a-d of the plurality of geographic areas are each assigned a respective bandwidth part (BWP) or frequency. User equipment 101, which may be a satellite television receiver or a cellular device, among others, is shown to be disposed in a first geographic area 104a. The user equipment 101 communicates with the satellite 100 using a bandwidth part or frequency that is assigned to the geographic area 104a. It is noted that the assignment of bandwidth part or frequency for uplink and downlink communication of the user equipment 101 may be independent of each other.

Figure 2:
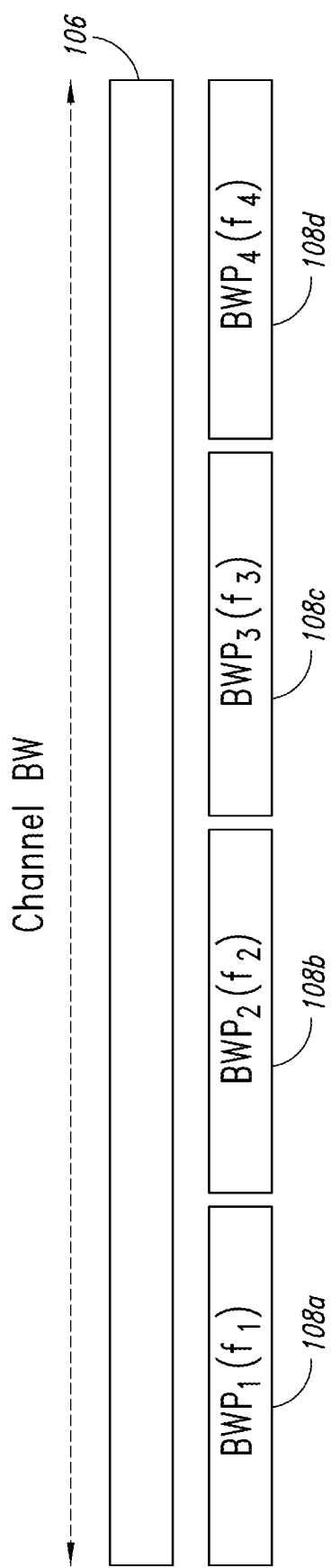
FIG. 2 shows an example of dividing a channel bandwidth of the satellite into a plurality of bandwidth parts.

FIG. 2 shows an example of dividing a channel bandwidth 106 of the satellite 100 into a plurality of bandwidth parts 108a-d. The plurality of bandwidth parts 108a-d includes first, second, third and fourth bandwidth parts 108a-d (denoted as "BWP$_1$," "BWP$_2$," "BWP$_3$," "BWP$_4$," respectively). The plurality of bandwidth parts 108a-d may be overlapping or non-overlapping in the channel bandwidth 106. The channel bandwidth 106 of the satellite 100 is divided into a plurality of subchannels.

As shown in FIG. 1, first, second, third and fourth geographic areas 104a, 104b, 104c, 104d of the set of geographic areas 104a-d are respectively assigned first, second, third and fourth bandwidth parts 108a-d. The bandwidth parts 108a-d are also referred to herein interchangeably as being frequencies ($BWP_1/f_1$, $BWP_2/f_2$, $BWP_3/f_3$, $BWP_4/f_4$). Frequency reuse is employed such that neighboring geographic areas also use the bandwidth parts 108a-d. For example, a set of four other neighboring geographic areas of the plurality of geographic areas may respectively use the plurality of bandwidth parts 108a-d.

Thus, the coverage area 102 of the satellite 100 is divided into geographic areas that are spatially separated. The geographic areas are assigned independent bandwidth parts 108a-d depending on a reuse factor (denoted as 'K'). Four geographical areas 104a-d are illustrated in FIG. 1 thereby making the frequency reuse factor for the environment four (K=4). Although four geographical areas 104a-d are illustrated, it is noted that any other reuse factor may be used. Thus, satellite communication in a geographic area may use the same frequency as another area and the coverage area 102 provided that the geographic areas are spatially separated (for example, non-neighboring) or sufficiently distanced apart.

The user equipment 101 may be configured to communicate over any number of bandwidth parts. For example, the user equipment 101 may be configured to communicate over four uplink bandwidth parts and four downlink bandwidth parts, among other types of configurations. The user equipment 101 may have one active uplink bandwidth part and one active downlink bandwidth part at any one time instance. An active bandwidth part is the bandwidth part (of the bandwidth parts with which the user equipment 101 is configured) that the user equipment 101 may presently use to communicate with the non-terrestrial network via the satellite 100 (for example, depending on the geographic area 104 in which the user equipment 101 is disposed). The remaining bandwidth parts with which the user equipment 101 is configured may be inactive for the user equipment 101 and may not be used by the user equipment 101 to communicate, through satellite 100, with the non-terrestrial network.

The user equipment 101 may switch from one active bandwidth part to another, for example, as a result of movement or relocation of the user equipment 101 from one geographic area 104 to another geographic area 104. That is, depending on the bandwidth parts used in the geographic area 104 in which the user equipment 101 is disposed, the user equipment 101 may use, as an active bandwidth part, any one of the plurality of bandwidth parts 108a-d. In addition to relocation, the user equipment 101 may change its active bandwidth part due at least in part to bandwidth part reassignment of the geographic area 104 in which the user equipment 101 is disposed.

The non-terrestrial network or an entity thereof, such as the base station, may command the user equipment 101, through satellite 100, to change its active bandwidth part by radio resource control (RRC) signaling or level 1 downlink control information (L1 DCI), among others. RRC signaling may be slower than DCI signaling. Further, uplink and downlink bandwidth parts of the user equipment 101 may be switched independently of each other or depending on one another.

Figure 3:
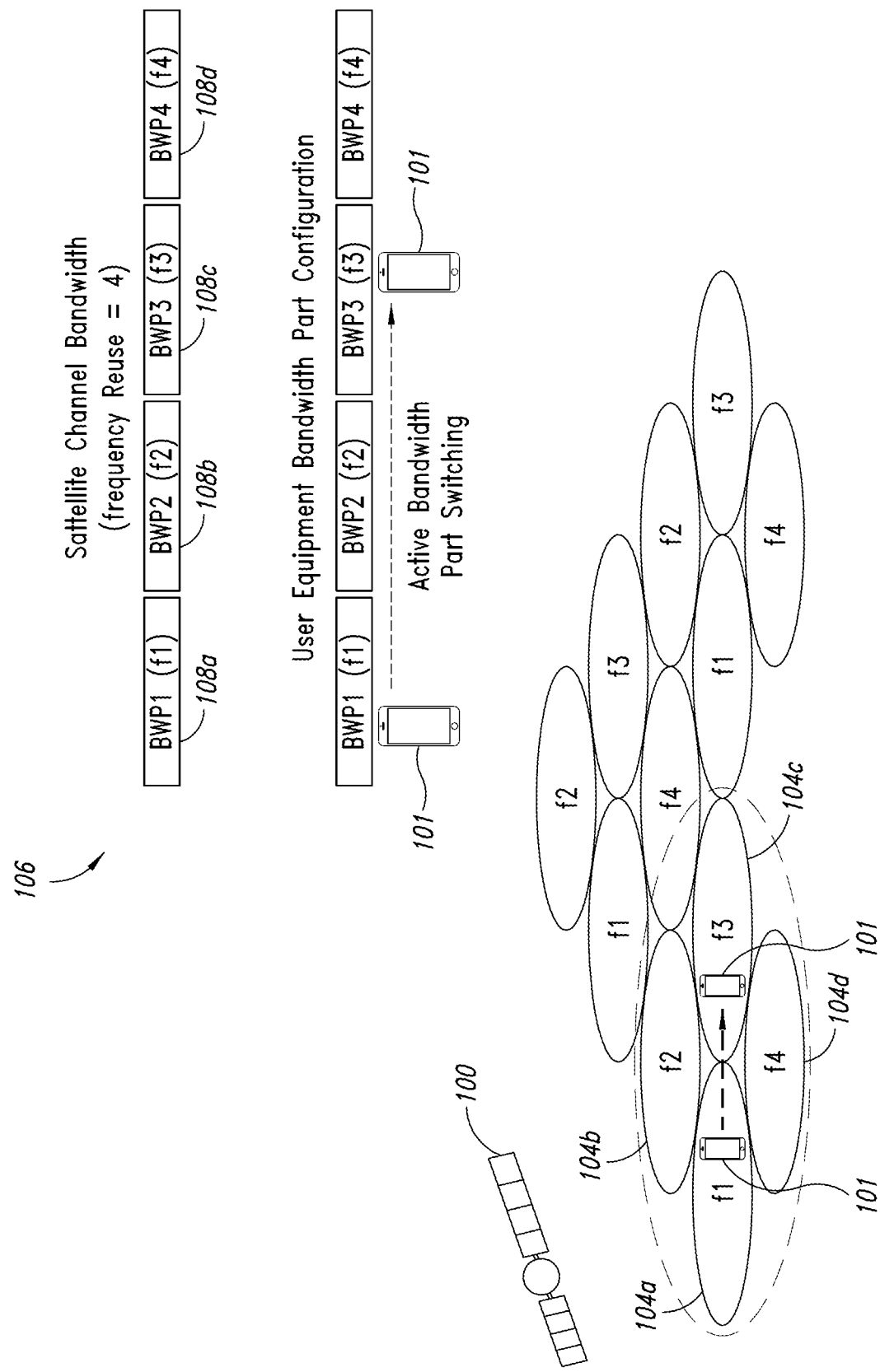
FIG. 3 shows an example of user equipment active bandwidth part switching.

FIG. 3 shows an example of user equipment 101 active bandwidth part switching. In FIG. 3, the reuse factor of the satellite 100 is the same as the number of bandwidth parts in the user equipment 101 bandwidth part configuration. Both the reuse factor of the satellite 100 and the number of configured bandwidth parts of the user equipment 101 are four. Depending on the geographic area 104, the satellite 100 (whether acting as a base station (or NodeB) or a relay for the base station) utilizes one of a plurality of bandwidth parts 108a-d for communicating with user equipment 101 in the geographic area 104. The user equipment 101 is configured to communicate over the plurality of bandwidth parts 108a-d, whereby at any one point one of the bandwidth parts 108 is active.

The user equipment 101 is initially positioned in the first geographic area 104a, whereby the active bandwidth part of the user equipment is the first bandwidth part 108a. The user equipment 101 then moves to the third geographic area 104c. The third geographic area 104c is served by the third bandwidth part 108c. As a result of the relocation, the user equipment 101 switches its active bandwidth part from the first bandwidth part 108a to the third bandwidth part 108c. The first bandwidth part 108a becomes inactive. A non-terrestrial network entity or the satellite 100 may transmit RRC signaling or a DCI to a user equipment 101 commanding the user equipment to switch its active bandwidth part.

Figure 4:
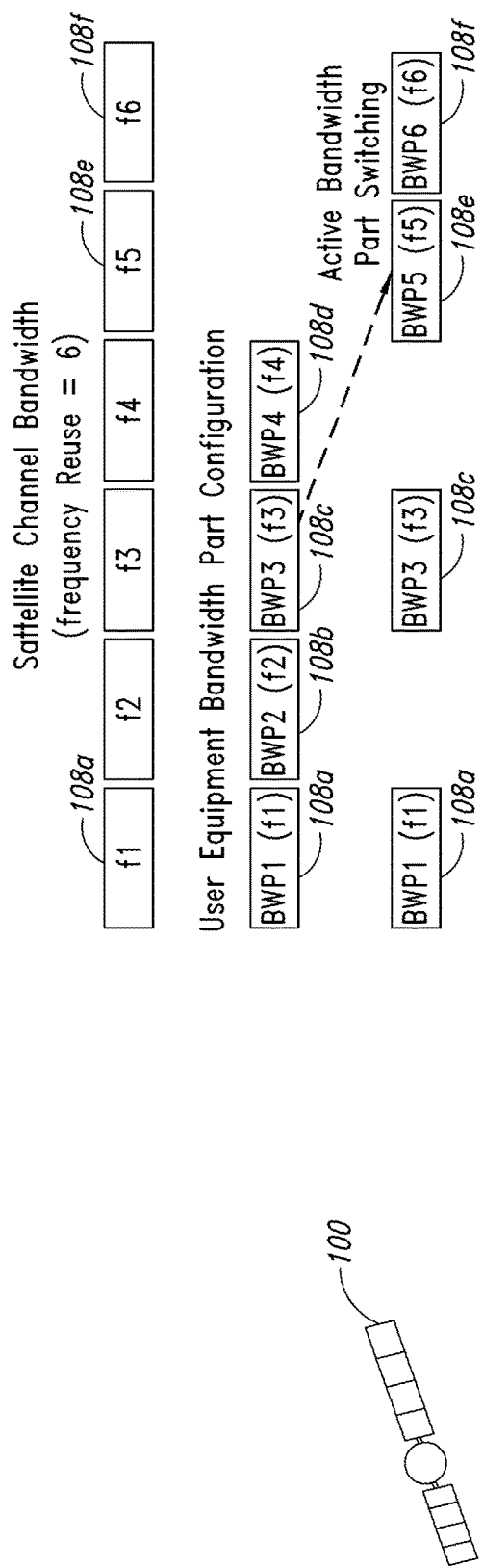
FIG. 4 shows an example of user equipment active bandwidth part switching.
Figure 4:
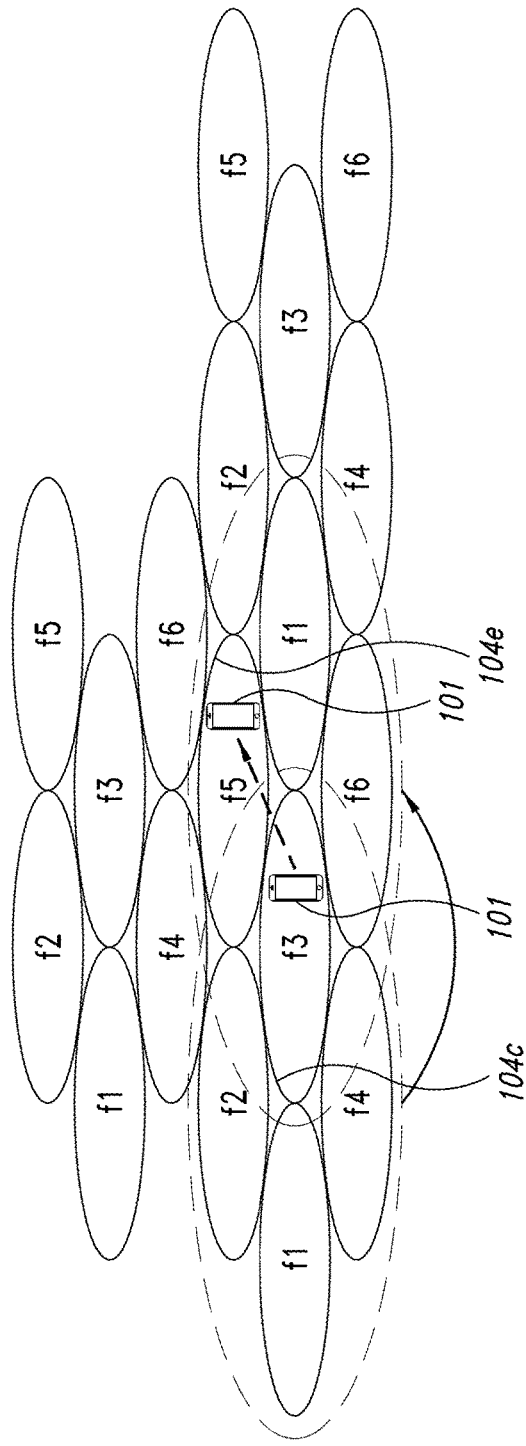

In the example illustrated in FIG. 4, the bandwidth parts with which the user equipment 101 is configured are identical to the bandwidth parts used by the satellite 100. Accordingly, the user equipment 101, when moving between geographic areas 104, switches between configured bandwidth parts. Reconfiguration of the bandwidth parts of the user equipment 101 is thereby not needed.

However, as described herein, when the user equipment 101 is configured with the bandwidth parts are different than the bandwidth parts of the satellite 100, the bandwidth parts of the user equipment 101 may be reconfigured when the user equipment 101 switches between bandwidth parts.

FIG. 4 shows an example of user equipment 101 active bandwidth part switching. The frequency reuse factor of the satellite 100 is different from the number of bandwidth parts in the user equipment 101 bandwidth part configuration. The frequency reuse factor of the satellite 100 is six, whereas the number of configured bandwidth parts of the user equipment 101 is four. The channel bandwidth 106 of the satellite 100 into six bandwidth parts 108a-f that are respectively assigned to six geographic areas 104a-f.

Initially, the user equipment 101 is configured with the first, second, third and fourth bandwidth parts 108a-d and is located in the third geographic area 104c. The active bandwidth part of the user equipment 101 is the third bandwidth part 108c. The user equipment 101 moves from the third geographic area 104c to the fifth geographic area 104e. The fifth geographic area 104e is served by the fifth bandwidth part 108e, which is not within the user equipment bandwidth part configuration.

The non-terrestrial network, through the satellite 100, changes the user equipment bandwidth part configuration. The satellite 100 may at least add the fifth bandwidth part 108e to the user equipment bandwidth part configuration and correspondingly remove one other bandwidth part from the configuration to keep the number of bandwidth parts in the configuration constant. A non-terrestrial network entity or the satellite 100, may transmit RRC signaling to the user equipment to configure the bandwidth parts of the user equipment 101.

As shown in FIG. 4, the non-terrestrial network, through the satellite 100, changes the bandwidth part configuration of the user equipment (from the first, second, third and fourth bandwidth parts 108a-d) to the first, third, fifth and sixth bandwidth parts 108a, 108c, 108e, 108f. Now that the new bandwidth part configuration of the user equipment 101 includes the fifth bandwidth part 108e, the user equipment 101 may use the fifth bandwidth part 108e as the active bandwidth part in the fifth geographic area 104e. The user equipment 101 may switch to the fifth bandwidth part 108e as the active bandwidth part in response to receiving RRC signaling or a DCI from a non-terrestrial network entity or the satellite 100 as described herein.

The bandwidth part of the user equipment 101 may be configured or reconfigured based on user equipment 101 movement history or a prediction algorithm, among others. For example, it may be desirable for the bandwidth part configuration of the user equipment 101 to be optimally selected in order to minimize RRC signaling. For example, the satellite 100 or another non-terrestrial network entity may track movement of the user equipment 101 and may obtain, based on the tracking, a list of geographic areas 104 frequently visited by the user equipment 101. The satellite 100 or another non-terrestrial network entity may configure the user equipment bandwidth part configuration to include the bandwidth parts 108 of the most frequently visited geographic areas 104. If that the most frequently visited geographic areas 104 do not include the geographic area to which the user equipment moved, the bandwidth part configuration may be revised to include the bandwidth part 108 of the geographic area 104 to which the user equipment moved (for example, by swapping the bandwidth part 108 of the geographic area 104 with another on the list of most frequently visited geographic areas 104).

In an embodiment where the bandwidth part configuration of the user equipment 101 includes four (or a maximum of four) bandwidth parts 108, the bandwidth parts 108 of the four most frequently visited geographic areas 104 may be included in the configuration. If that the bandwidth part 108 of the geographic area 104 to which the user equipment 101 moved is not among the bandwidth parts 108 of the four most frequently visited geographic areas 104, the bandwidth part 108 of the fourth most frequently visited geographic areas 104 may be removed from the configuration and replaced with the bandwidth part 108 of the geographic area 104 to which the user equipment 101 moved.

Setting the user equipment bandwidth part configuration may be based on prediction of user equipment 101 movement. For example, if the movement of the user equipment 101 indicates forthcoming transition to one or more different geographic areas 104, the satellite 100 or another non-terrestrial network entity may configure the user equipment bandwidth part configuration to include the bandwidth parts 108 of the one or more different geographic areas 104. Predicting the user equipment 101 movement may be based on past or historical movement of the user equipment or other user equipment served by the satellite 100 or another non-terrestrial network entity. Accordingly, the reconfiguration of the user equipment 101 bandwidth part configuration may be minimized.

A satellite cluster may be defined as a set of satellite beams, where none of the beams use the same frequency. The set of satellite beams in a cluster may be $f_1, f_2, \ldots, f_K$ (K is the frequency reuse factor). The union of the set of satellite beams in the cluster may cover the entire system channel bandwidth.

As described herein, each satellite beam corresponds to a bandwidth part 108 and may be covered by bandwidth part 108. Accordingly, the resources of the satellite beams of the cluster may not overlap in frequency because they independently correspond to different bandwidth parts 108 of the system channel bandwidth 106. The time and frequency resources of satellite beams of a cluster may overlap and are, thus, not orthogonal in the time and frequency domains. However, the satellite beams of the cluster are orthogonal in the space domain. Different clusters are also spatially orthogonal with one another but are not orthogonal in the time and frequency domains.

Each cluster may have a unique identifier. The number of satellite clusters (L) may depend on the channel frequency. For example, if the channel frequency is less than or equal to three GigaHertz (GHz), the number of satellite clusters may be 4. If the channel frequency is greater than three GHz but less than or equal to 7.125 GHz, the number of satellite clusters may be eight and if the frequency is greater than 7.125 GHz, then the number of satellite clusters may be L=64.

In an embodiment, a satellite 100 may cover a large geographic region, such as the contiguous United States. The satellite 100 may have multiple clusters (L) necessary to cover the geographic region, where each cluster covers K geographic areas 104. Alternatively, more than one satellite 100 may cover a large geographic region, such as the contiguous United States. Satellite-to-satellite handover may be performed.

Figure 5:
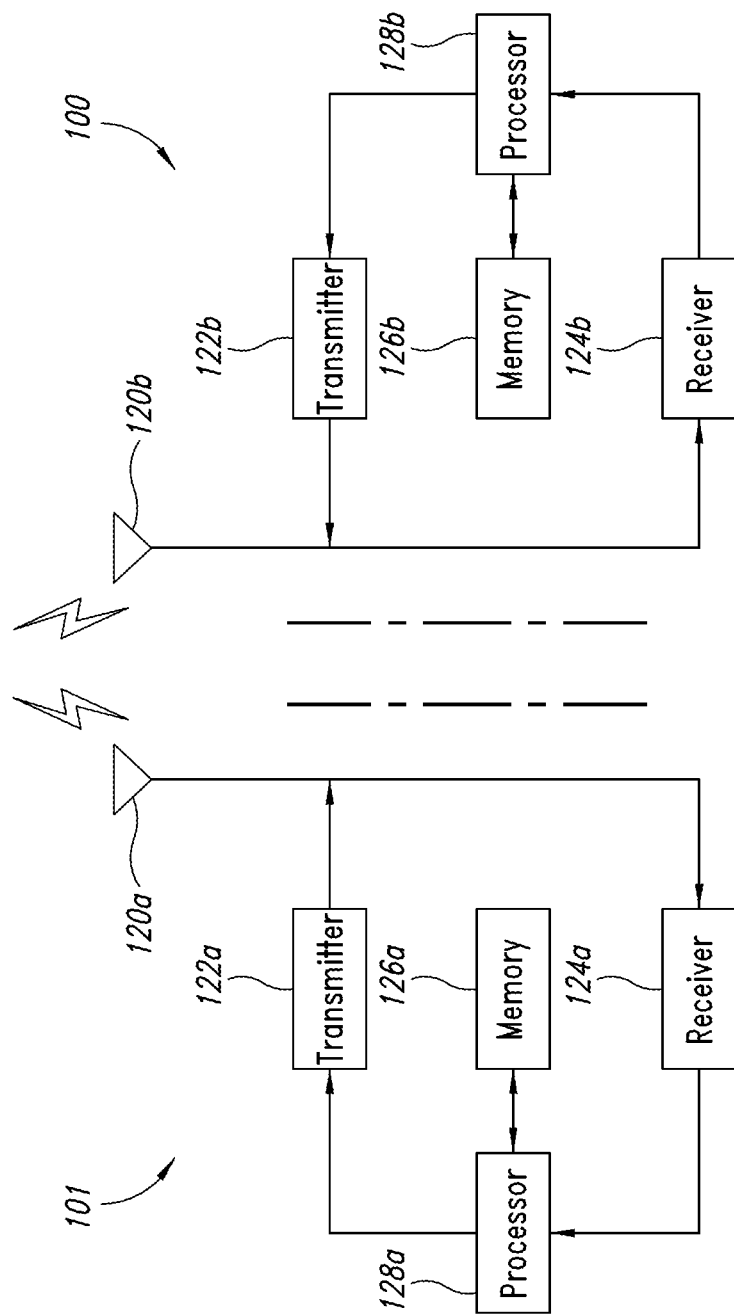
FIG. 5 is a block diagram of a satellite and user equipment.

FIG. 5 is a block diagram of a satellite 100 and user equipment 101. As described herein, the satellite 100 may be a base station. The user equipment 101 transmits in the uplink and receives in the downlink. The satellite 100 receives in the uplink and transmits in the downlink. The user equipment 101 and the satellite 100 respectively include one or more antennas 120a, 120b for receiving signals, which may be electromagnetic signals.

The user equipment 101 and the satellite 100 respectively include a transmitter 122a, 122b. The transmitter 122a, 122b may be any type of device configured to transmit a signal by controlling the one or more antennas 120a, 120b, respectively. The user equipment 101 and the satellite 100 respectively include a receiver 124a, 124b, which may be any type of device configured to transmit a signal by controlling the one or more antennas 120a, 120b, respectively.

The user equipment 101 and the satellite 100 or another non-terrestrial network entity respectively include memory 126a, 126b. The memory 126a, 126b may be any type of non-transitory computer-readable storage medium. The memory 126a, 126b may be read-only memory (ROM) or random access memory (RAM), among others.

Further, the memory 126a, 126b may be static or dynamic. The memory 126a, 126b stores the computer-executable instructions that may be retrieved or accessed by a respective processor 128a, 128b for execution. The computer-executable instructions, when executed by the respective processor 128a, 128b, cause the respective processor 128a, 128b (or user equipment 101 satellite 100) to operate as described herein.

The user equipment 101 and the satellite 100 or another non-terrestrial network entity include the processor 128a, 128b, respectively. The processor 128a, 128b is configured to perform the techniques and methods described herein. The transmitter 122a, 122b, the memory 126a, 126b, the receiver 124a, 124b, the processor 128a, 128b and the one or more antennas 120a, 120b within the user equipment 101 or the satellite 100 may be configured to mutually interact with one another. The transmitter 122a, receiver 124a, memory 126a and processor 128a of the user equipment 101 may respectively be implemented by a separate chip as independent elements, or may be implemented by two or more chips. The transmitter 122a, 122b and the receiver 124a, 124b may be incorporated into one device, whereby one transceiver may be implemented within the user equipment 101 or the satellite 100 or another non-terrestrial network entity. The one or more antennas 120a, 120b configured to wirelessly transmit a signal generated by the transmitter 122a, 122b to an external environment, or receive a radio signal from the external environment and transfer the received radio signal to the receiver 124a, 124b. Transmission and reception devices that support multi-input multi-output (MIMO) communication for data transmission and reception based on multiple antennas may be used.

The processor 128a, 128b generally controls the overall operation of the user equipment 101 or the satellite 100. In particular, the processor 128a, 128b may perform various control functions for performing the techniques described herein, a variable Medium Access Control (MAC) frame control function based on service characteristics and a propagation environment, a power saving mode for controlling an idle mode operation, a handover (HO) function, an authentication and encryption function, and the like. The processor 128a, 128b may be a controller, a microcontroller, a microprocessor, or a microcomputer. The processor 128a, 128b may be implemented by hardware, firmware, software, or their combination. An application specific integrated circuits (ASICs), digital signal processors (DSPs), digital signal processing devices (DSPDs), programmable logic devices (PLDs), and field programmable gate arrays (FPGAs), which are configured to perform the techniques described herein, may be provided in the processor 128a, 128b.

The transmitter 122a, 122b may perform coding and modulation of data, which are scheduled from the processor 128a, 128b or a scheduler coupled to the processor 128a, 128b. For example, the transmitter 122a, 122b may convert data streams intended for transmission into signal streams through de-multiplexing, channel coding, modulation, and the like. The signal streams are transmitted through a transmitting processor within the transmitter and the transmitting antenna 120a, 120b in due order. The transmitter 122a, 122b and the receiver 124a, 124b of the user equipment 101 and the satellite 100 may be configured differently depending on a processing procedure of transmitting and receiving signals.

It is noted that when the satellite 100 is a regenerative satellite, the satellite 100 may include the memory 126b and the processor 128b. Conversely, if the satellite 100 is a bent-pipe satellite that acts as a relay for another non-terrestrial network entity, such a base station, the satellite 100 may not include the memory 126b or the processor 128b. As a bent-pipe satellite (transparent satellite), the satellite 100 may include an amplifier, filter, frequency converter and transmitter and may not include memory or processing functionality.

A regenerative satellite may configure the user equipment 101 with the user equipment bandwidth part configuration and switch the active bandwidth part of the user equipment 101. Conversely, a transparent satellite may act as a relay for a base station in another part of the non-terrestrial network, whereby the base station controls bandwidth part configuration and switching of the user equipment 101.

Figure 6:
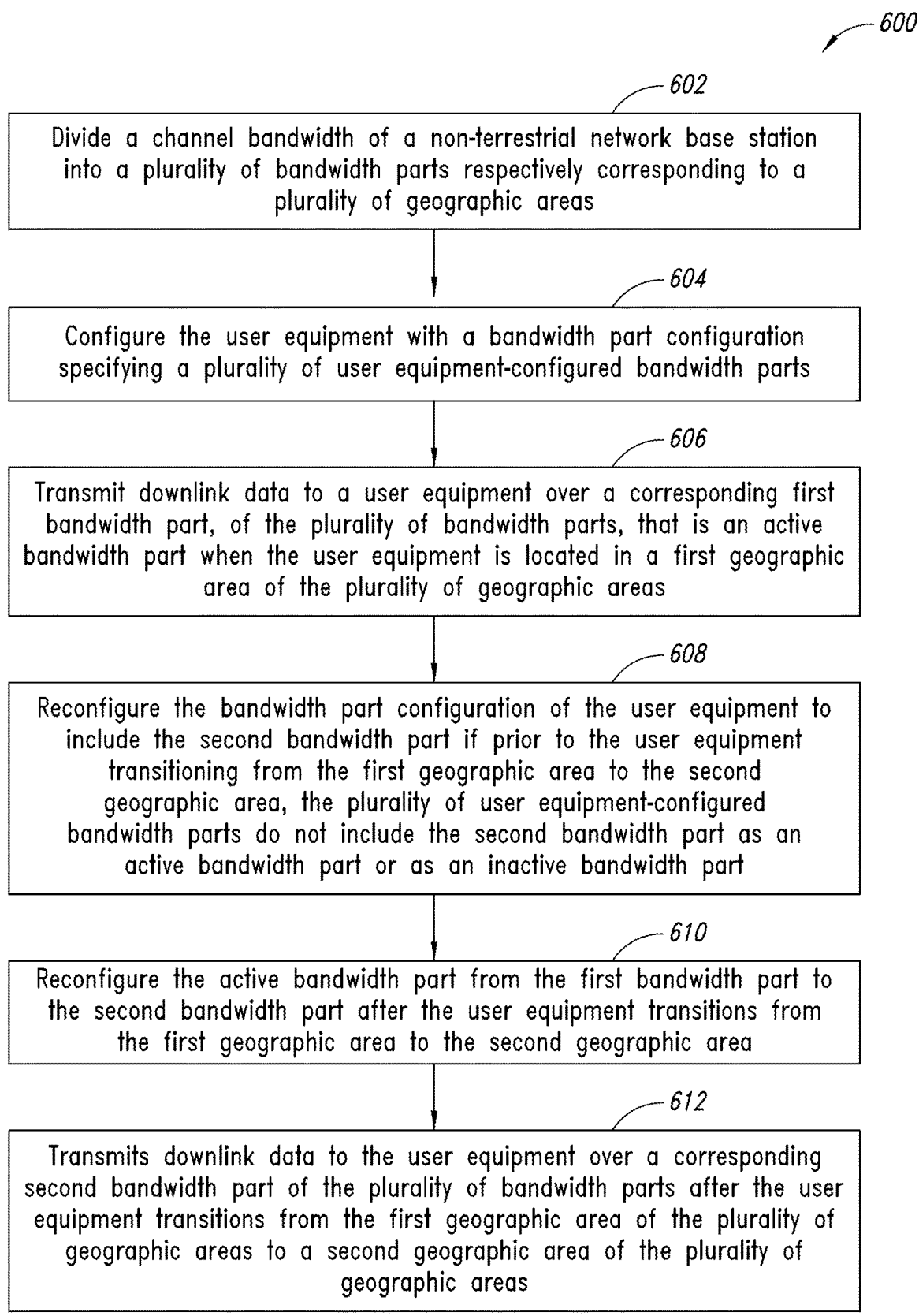
FIG. 6 shows a method for beam switching in a non-terrestrial network.

FIG. 6 shows a method 600 for beam switching in a non-terrestrial network. The method 600 includes dividing, at 602, a channel bandwidth of a non-terrestrial network base station into a plurality of bandwidth parts respectively corresponding to a plurality of geographic areas. Each bandwidth part of the plurality of bandwidth parts may be respectively associated with a satellite beam of a plurality of satellite beams. At 604, the non-terrestrial network base station configures the user equipment with a bandwidth part configuration specifying a plurality of user equipment-configured bandwidth parts. When the user equipment is located in the first geographic area of the plurality of geographic areas, the plurality of user equipment-configured bandwidth parts include the first bandwidth part as an active bandwidth part and remaining bandwidth parts of the plurality of user equipment-configured bandwidth parts are inactive bandwidth parts.

At 606, the non-terrestrial network base station transmits downlink data to a user equipment over a corresponding first bandwidth part, of the plurality of bandwidth parts, when the user equipment is located in a first geographic area of the plurality of geographic areas. At 608, the non-terrestrial network base station reconfigures the bandwidth part configuration of the user equipment to include the second bandwidth part if prior to the user equipment transitioning from the first geographic area to the second geographic area, the plurality of user equipment-configured bandwidth parts do not include the second bandwidth part as the active bandwidth part or as an inactive bandwidth part.

At 610, the non-terrestrial network base station reconfigures the active bandwidth part from the first bandwidth part to the second bandwidth part after the user equipment transitions from the first geographic area to the second geographic area. At 612, the non-terrestrial network base station, after the user equipment transitions from the first geographic area of the plurality of geographic areas to a second geographic area of the plurality of geographic areas, transmits downlink data to the user equipment over a corresponding second bandwidth part of the plurality of bandwidth parts. After the user equipment transitions from the first geographic area to the second geographic area, the plurality of user equipment-configured bandwidth parts include the second bandwidth part as the active bandwidth part and remaining bandwidth parts of the plurality of user equipment-configured bandwidth parts are inactive bandwidth parts.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user equipment, comprising:
a receiver configured to receive downlink data including a bandwidth part configuration specifying a plurality of user equipment-configured bandwidth parts that are determined based on predicting movement of the user equipment, wherein each user equipment-configured bandwidth part of the plurality of user equipment-configured bandwidth parts corresponds to a geographic area of a plurality of geographic areas and is associated with a satellite beam of a plurality of satellite beams; and a transmitter configured to transmit uplink data based on the bandwidth part configuration, wherein:
in response to the user equipment being positioned in a first geographic area of the plurality of geographic areas, the transmitter is configured to transmit the uplink data using a first user equipment-configured bandwidth part, of the plurality of user equipment-configured bandwidth parts, corresponding to the first geographic area, and
in response to the user equipment transitioning to a second geographic area of the plurality of geographic areas, the transmitter is configured to transmit the uplink data using a second user equipment-configured bandwidth part, of the plurality of user equipment-configured bandwidth parts, corresponding to second first geographic area.

2. The user equipment according to claim 1, wherein:
in response to the user equipment being located in the first geographic area of the plurality of geographic areas, the plurality of user equipment-configured bandwidth parts include the first user equipment-configured bandwidth part as an active bandwidth part and remaining bandwidth parts of the plurality of user equipment-configured bandwidth parts are inactive bandwidth parts.

3. The user equipment according to claim 2, wherein:
in response to a frequency reuse factor being greater than one and the user equipment transitioning from the first geographic area to the second geographic area, the plurality of user equipment-configured bandwidth parts include the second user equipment-configured bandwidth part as the active bandwidth part and remaining bandwidth parts of the plurality of user equipment-configured bandwidth parts are inactive bandwidth parts.

4. The user equipment according to claim 3, wherein in response to the plurality of user equipment-configured bandwidth parts not including the second user equipment-configured bandwidth part as the active bandwidth part or as an inactive bandwidth part prior to the user equipment transitioning from the first geographic area to the second geographic area, a non-terrestrial network base station reconfigures the bandwidth part configuration of the user equipment to include the second user equipment-configured bandwidth part.

5. The user equipment according to claim 2, wherein the receiver is configured to receive the bandwidth part configuration by radio resource control (RRC) signaling or downlink control information (DCI).

6. The user equipment according to claim 1, wherein the plurality of user equipment-configured bandwidth parts are non-overlapping in a frequency domain.

7. The user equipment according to claim 1, wherein in response to a frequency reuse factor being greater than one, the first user equipment-configured bandwidth part is associated with a third geographic area different than the first geographic area.

8. The user equipment according to claim 1, wherein in response to the transmitter switching transmission of the uplink data from the first user equipment-configured bandwidth part to the second user equipment-configured bandwidth part, the receiver switches reception of the downlink data from a first uplink bandwidth part to a second uplink bandwidth part.

9. The user equipment according to claim 1, wherein a non-terrestrial network entity is configured to predict the movement of the user equipment based on past or historical movement of the user equipment.

10. The user equipment according to claim 9, wherein the plurality of user equipment-configured bandwidth parts respectively correspond to geographic areas most frequently visited by the user equipment.

11. The user equipment according to claim 10, wherein a number of the geographic areas most frequently visited by the user equipment is a frequency reuse factor.

12. The user equipment according to claim 10, wherein:
in response to the user equipment transitioning to a geographic area not among the geographic areas most frequently visited by the user equipment, a bandwidth part corresponding to a lowest ranked geographic area of the geographic areas most frequently visited by the user equipment is removed from the bandwidth part configuration.

13. The user equipment according to claim 12, wherein:
in response to the user equipment transitioning to the geographic area not among the geographic areas most frequently visited by the user equipment, a bandwidth part corresponding to the geographic area not among the geographic areas most frequently visited by the user equipment is added to the bandwidth part configuration.

14. A method, comprising:
receiving, by a user equipment, downlink data including a bandwidth part configuration specifying a plurality of user equipment-configured bandwidth parts that are determined based on predicting movement of the user equipment, wherein each user equipment-configured bandwidth part of the plurality of user equipment-configured bandwidth parts corresponds to a geographic area of a plurality of geographic areas and is associated with a satellite beam of a plurality of satellite beams; and
transmitting uplink data based on the bandwidth part configuration, transmitting the uplink data including:
in response to the user equipment being positioned in a first geographic area of the plurality of geographic areas, transmitting the uplink data using a first user equipment-configured bandwidth part, of the plurality of user equipment-configured bandwidth parts, corresponding to the first geographic area, and
in response to the user equipment transitioning to a second geographic area of the plurality of geographic areas, transmitting the uplink data using a second user equipment-configured bandwidth part, of the plurality of user equipment-configured bandwidth parts, corresponding to second first geographic area.

15. The method according to claim 14, wherein:
in response to the user equipment being located in the first geographic area of the plurality of geographic areas, the plurality of user equipment-configured bandwidth parts include the first user equipment-configured bandwidth part as an active bandwidth part and remaining bandwidth parts of the plurality of user equipment-configured bandwidth parts are inactive bandwidth parts.

16. The method according to claim 15, wherein:
in response to a frequency reuse factor being greater than one and the user equipment transitioning from the first geographic area to the second geographic area, the plurality of user equipment-configured bandwidth parts include the second user equipment-configured bandwidth part as the active bandwidth part and remaining bandwidth parts of the plurality of user equipment-configured bandwidth parts are inactive bandwidth parts.

17. The method according to claim 16, wherein in response to the plurality of user equipment-configured bandwidth parts not including the second user equipment-configured bandwidth part as the active bandwidth part or as an inactive bandwidth part prior to the user equipment transitioning from the first geographic area to the second geographic area, the bandwidth part configuration is reconfigured to include the second user equipment-configured bandwidth part.

18. The method according to claim 14, comprising:
   predicting the movement of the user equipment based on past or historical movement of the user equipment.

19. The method according to claim 14, wherein the plurality of user equipment-configured bandwidth parts respectively correspond to geographic areas most frequently visited by the user equipment.

20. The method according to claim 19, comprising:
   in response to the user equipment transitioning to a geographic area not among the geographic areas most frequently visited by the user equipment,
      removing from the bandwidth part configuration a bandwidth part corresponding to a lowest ranked geographic area of the geographic areas most frequently visited by the user equipment; and
      adding to the bandwidth part configuration a bandwidth part corresponding to the geographic area not among the geographic areas most frequently visited by the user equipment.

* * * * *